(12) United States Patent
Roach et al.

(10) Patent No.: US 10,710,405 B2
(45) Date of Patent: Jul. 14, 2020

(54) TELESCOPING AXLE INSERT WITH CONTOURED INNER END FOR AN AGRICULTURAL PRODUCT APPLICATOR

(71) Applicant: CNH Industrial America LLC, New Holland, PA (US)

(72) Inventors: William A. Roach, Lake Lillian, MN (US); Stephen Stuhr, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 314 days.

(21) Appl. No.: 15/834,544

(22) Filed: Dec. 7, 2017

(65) Prior Publication Data

US 2019/0176518 A1 Jun. 13, 2019

(51) Int. Cl.
*B60B 35/10* (2006.01)
*B60B 35/00* (2006.01)

(52) U.S. Cl.
CPC .......... *B60B 35/109* (2013.01); *B60B 35/001* (2013.01); *B60B 35/10* (2013.01); *B60B 35/1054* (2013.01); *B60Y 2200/22* (2013.01)

(58) Field of Classification Search
CPC ......... B60B 35/04; B60B 35/08; B60B 35/10; B60B 35/1036; B60B 35/1072; B60B 35/109
See application file for complete search history.

(56) References Cited

U.S. PATENT DOCUMENTS

| | | | |
|---|---|---|---|
| 5,121,808 A | * | 6/1992 | Visentini ............... B60B 35/003 180/435 |
| 5,464,243 A | | 11/1995 | Maiwald et al. |
| 5,597,172 A | | 1/1997 | Maiwald et al. |
| 6,139,045 A | | 10/2000 | Vandenbark et al. |
| 6,199,769 B1 | | 3/2001 | Weddle |
| 6,892,124 B2 | | 5/2005 | Humpal et al. |
| 7,731,301 B2 | | 6/2010 | Pell et al. |
| 7,963,361 B2 | | 6/2011 | Coers et al. |
| 8,042,817 B2 | | 10/2011 | Motebennur et al. |
| 8,398,179 B2 | | 3/2013 | Mackin et al. |
| 8,573,846 B2 | | 11/2013 | Mackin et al. |

(Continued)

OTHER PUBLICATIONS

AG Systems, Nitromaster Tools, pp. 1-2.

(Continued)

*Primary Examiner* — Jason R Bellinger
(74) *Attorney, Agent, or Firm* — Rebecca L. Henkel; Rickard K. DeMille

(57) ABSTRACT

A telescoping axle arrangement is provided for an agricultural applicator having a frame supported above a ground surface by a ground engaging wheel operatively connected to the frame by the telescoping axle arrangement. A tubular first axle element, and a second axle element slidingly inserted into the first element operatively connect the wheel to the frame, and provide extension and retraction of the axle along a longitudinal axis of the axle. A cylindrical tunnel passing through the first element limits the extent to which the second axle element can be inserted into the first axle element. An inner end of the second axle element is contoured to extend at least partly under the cylindrical tunnel in the second axle element when the second axle element is inserted at a maximum allowed depth into the first axle element.

20 Claims, 3 Drawing Sheets

(56) References Cited

U.S. PATENT DOCUMENTS

| | | |
|---|---|---|
| 9,156,312 B1 | 10/2015 | Ruggeri |
| 9,259,986 B2 | 2/2016 | Slawson |
| 2016/0081259 A1 | 3/2016 | Bonte et al. |
| 2019/0023071 A1* | 1/2019 | Moen .................... B60B 35/109 |
| 2019/0210406 A1* | 7/2019 | Amundson ............. B60B 35/10 |

OTHER PUBLICATIONS

Dealers Get First Look at KINZE's Vision Control System: In Partnership With Ames-Based Leader, KINZE Has Incorporated New Precision Technology on 3600V Twin-Line Planters, Implement & Tractor 122.4 (Jul. 2007-Aug. 2007), 20(2), pp. 1-3.
Summers Manufacturing, Sprayers & Applicators—LT Series Sprayer, pp. 1-2.

* cited by examiner

TELESCOPING AXLE INSERT WITH CONTOURED INNER END FOR AN AGRICULTURAL PRODUCT APPLICATOR

FIELD OF THE INVENTION

This invention generally relates to a telescoping axle arrangement for an agricultural applicator, and more particularly to an arrangement having an axle insert including an advantageously contoured inner end of the insert.

BACKGROUND OF THE INVENTION

Agricultural chemicals and fertilizers must be applied within very narrow time windows for maximum effectiveness. In some cases, this means that application must be performed after the crops have emerged, and sometimes even after the crops have grown to a height of several feet tall. To apply chemicals and fertilizers without damaging standing crops specialized self-propelled agricultural product applicators, having high ground clearance, such as so-called high-boy sprayers or dry product applicators, are often utilized with standing crops. The high ground clearance allows the applicator to move through the standing crops without damaging them.

Such high ground clearance applicators also typically utilize independent drive and suspension systems for each wheel of the applicator, and provide some means for adjusting the track width of the wheels to match the row spacing of the crop being treated. Since the row spacing varies for different types of crops, and as a matter of custom in various locations, such self-propelled applicators also typically include some apparatus for adjusting the track width to match the row spacing.

Track-width adjustments systems can be manually operable, but for ease of operation it is more typical to include a powered arrangement for adjusting track width, through use of some form of actuator, such as a hydraulic cylinder, for extending and retracting one or more axles of the applicator in a direction transverse to the direction of travel of the applicator.

It is desirable for telescoping parts of an adjustable axle arrangement to provide a maximum engagement length at all allowable track widths. As applicators have become larger and heavier, and designed to be convertible for use with multiple forms of applicators, such as dry boxes and sprayers, traditional configurations for primary chassis and suspension systems used in prior applicators have been adapted in ways that provide significant new challenges for telescoping adjustable axle arrangements. One such adaptation involves providing a passage through a telescoping axle arrangement for a drive shaft, or other components. It is, therefore, desirable to provide an improved telescoping axle arrangement and method, that include provisions for accommodating a passage through the telescoping axle arrangement in a manner that allows for maintaining maximum possible engagement between telescoping elements of the axle at all allowable track widths.

BRIEF SUMMARY OF THE INVENTION

The invention provides an improved telescoping axle arrangement for an agricultural applicator having a frame supported above a ground surface by a ground engaging wheel operatively connected to the frame by the telescoping axle arrangement. The invention may also take other forms, such as an agricultural applicator, a frame for an agricultural applicator, or a method for adjusting track width in an agricultural applicator.

A telescoping axle arrangement, according to the invention, may include a tubular first axle element, and a second axle element slidingly inserted into the first element for operatively connecting the wheel to the frame, in a manner providing extension and retraction of the axle along a longitudinal axis of the axle. A cylindrical tunnel passing through the first element may limit the depth to which the second axle element can be inserted into the first axle element. An inner end of the second axle element may be contoured to extend at least partly under the cylindrical tunnel in the second axle element when the second axle element is inserted at a maximum allowed depth into the first axle element.

In one form of the invention, a telescoping axle arrangement for an agricultural applicator includes a frame supported above a ground surface by a ground engaging wheel operatively connected to the frame by the telescoping axle arrangement. The telescoping axle arrangement may include first and second slidingly engaging axle elements adapted for operative connection between the frame and the wheel, for sliding extension and retraction along a longitudinal axis of the axle. The first axle element may have a tubular portion, and the second axle element may be configured for sliding engagement within the tubular portion of the first axle element, with the second axle element having an inner end adapted for insertion into the first axle element. The tubular portion of the first axle element may define a generally tubular cross section perpendicular to the longitudinal axis of the axle. The first axle element may also have an obstruction extending into the interior of the tubular cross section and limiting insertion of the inner end of the second axle element into the first axle element along the longitudinal axis of the axle. The obstruction and the inner end of the second axle element may be cooperatively contoured such that the inner end of the second axle element extends at least partly past the obstruction in the second axle element when the second axle element is inserted at a maximum allowed depth into the first axle element.

In various forms of the invention, the frame of the applicator may define a fore-aft axis of the applicator, and a transverse axis extending generally transverse to the fore-aft axis and substantially horizontal to the ground surface. And, the first axle element may be adapted for fixed attachment to the frame with the longitudinal axis of the telescoping axle arrangement extending generally along the transverse axis of the frame.

Where the frame of the applicator is subject to a downward load, the obstruction in the first axle element may extend in the fore-aft direction into the tubular cross section of the first axle element, and the inner end of the second axle element may be contoured such that the bottom surface of the second axle element is longer than the top surface of the second axle element to extend at least partly beneath the obstruction.

In some forms of the invention, the obstruction in the first axle element may be a tubular-shaped tunnel extending in the fore-aft direction through the first axle element. The tubular-shaped tunnel may have a cylindrical cross section, in some forms of the invention.

The contoured inner end of the second axle element may be shaped to include an upwardly expanding tapered section extending from an inner distal end of the second axle. The contoured inner end of the second axle element may also be shaped to include a first upwardly expanding tapered section extending from an inner distal end of the second axle element to a point of intersection with a vertically extending section of the contoured end.

A method for practicing the invention may include contouring an inner end of an axle insert element to extend partly past an obstruction in a tubular axle element adapted for receiving the axle insert, to thereby increase the effective overlapping engagement of the axle insert inside the tubular axle element at all extension widths of a telescoping axle arrangement.

Other aspects, objects and advantages of the invention will be apparent from the following detailed description and accompanying drawings of exemplary embodiments of the invention.

BRIEF DESCRIPTION OF THE DRAWINGS

The accompanying drawings form a part of the specification and illustrate several aspects of the present invention and, together with the description, serve to explain the invention. In the drawings.

While the invention will be described in connection with certain exemplary embodiments, there is no intent to limit it to those embodiments. On the contrary, the intent is to cover all alternatives, modifications and equivalents included within the spirit and scope of the invention.

DETAILED DESCRIPTION OF THE INVENTION

Figure 1:
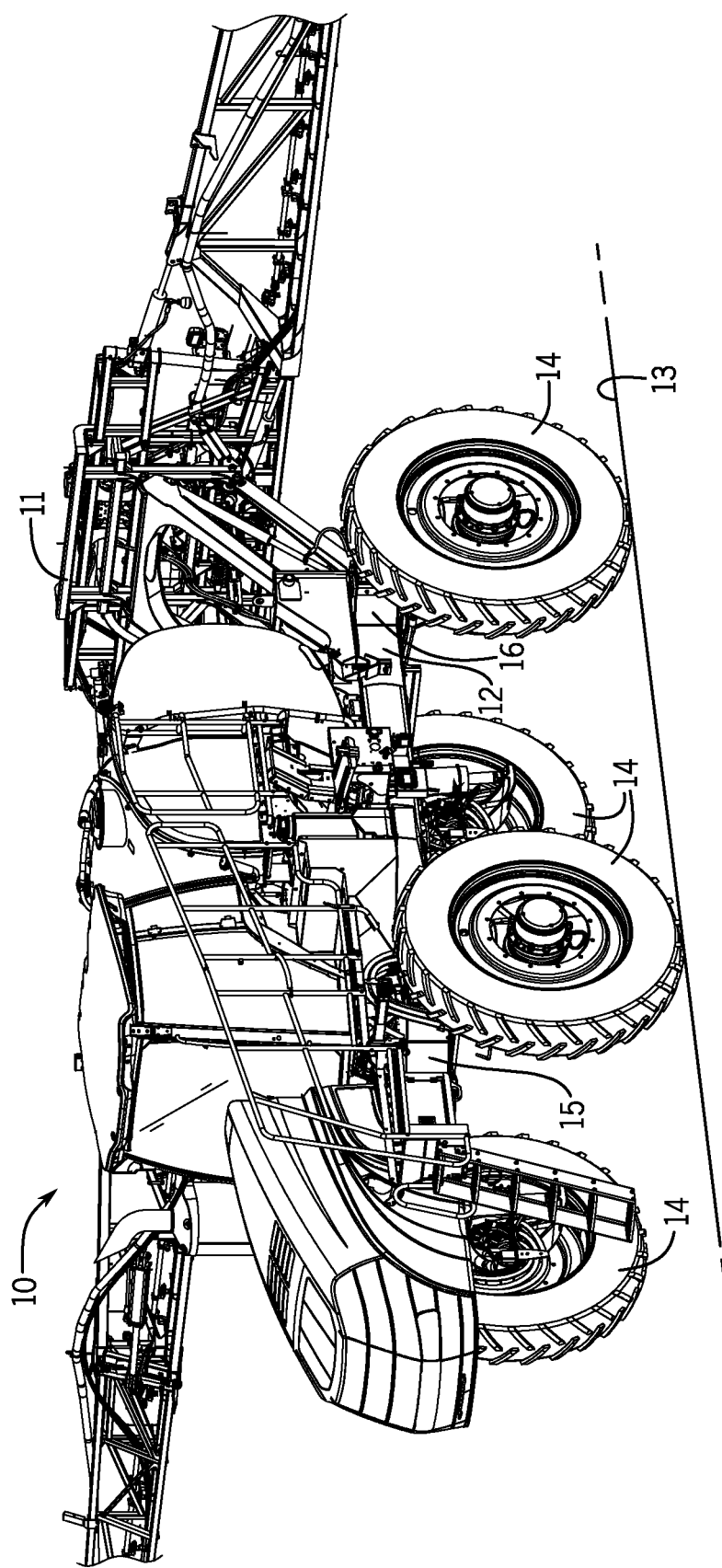
FIG. 1 is an isometric illustration of an exemplary embodiment of an agricultural product applicator, according to the invention, including front and rear telescoping axles.

FIG. 1 shows an exemplary embodiment of the invention, in the form of an agricultural applicator 10 carrying a sprayer apparatus 11. The Applicator 10 has a frame 12 that is supported above a ground surface 13 by four ground engaging wheels 14,14,14,14. The four wheels 14,14,14,14 are operatively connected to the frame 12 by a pair of front and rear telescoping axle arrangements 15,16 configured in accordance with the invention, in a manner described in more detail below.

Figure 2:
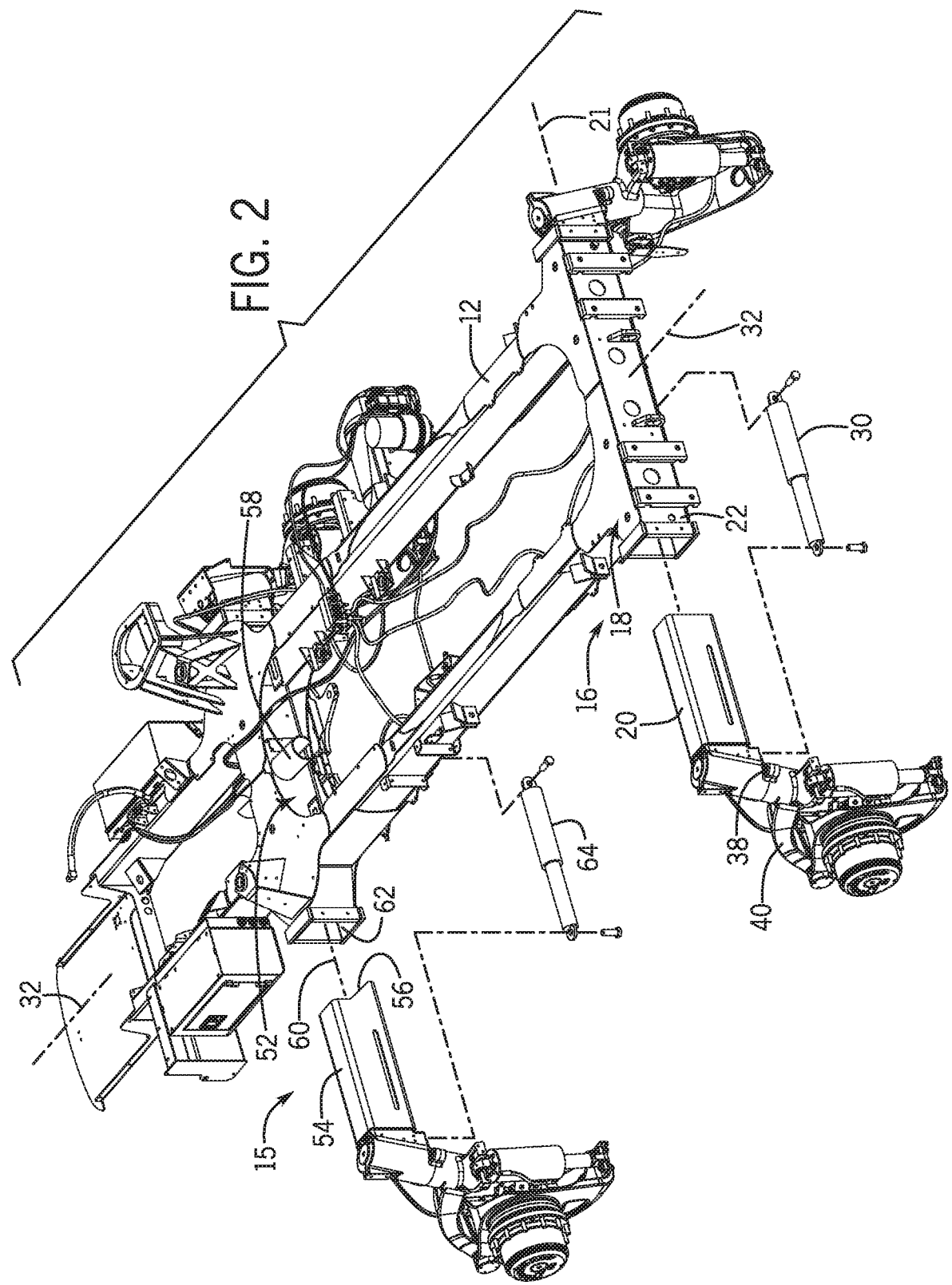
FIG. 2 is a partly exploded, isometric rear view illustration of a frame of the applicator of FIG. 1, showing a front telescoping axle arrangement according to the invention.
Figure 3:
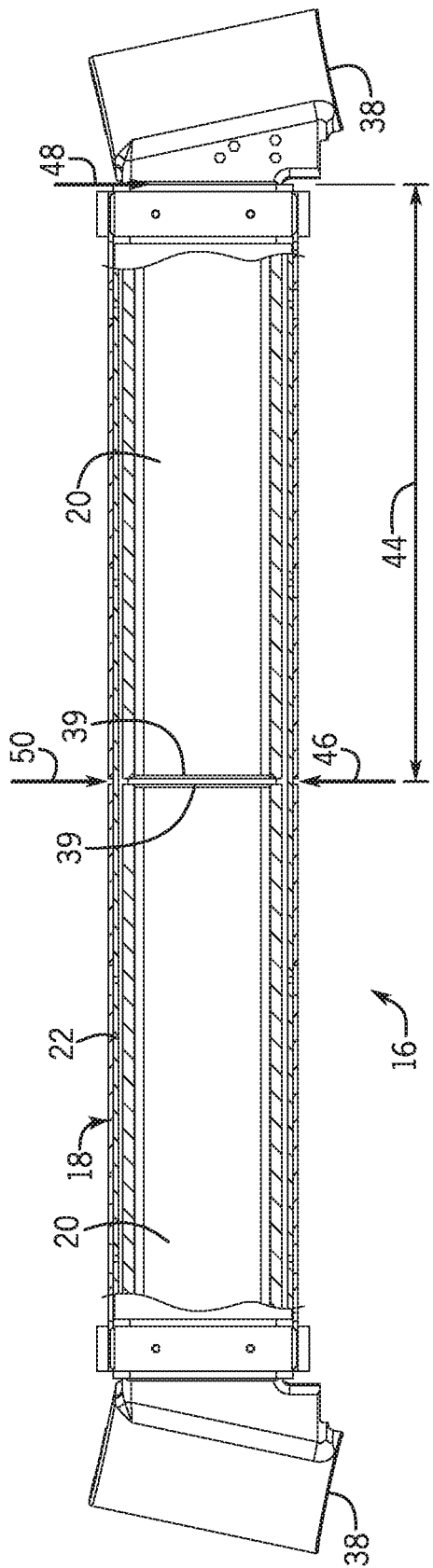
FIG. 3 is an orthographic, partially sectioned illustration of a rear telescoping axle of the applicator and frame of FIGS. 1 and 2, showing the exploded components of FIG. 2 in an assembled and fully retracted state.

As shown in FIGS. 2 and 3, the exemplary embodiment of the rear telescoping axle arrangement 16 includes first and second slidingly engaging rear axle elements 18,20 adapted for operative connection between the frame 12 and the left rear wheel 14, to provide extension and retraction of the first and second rear axle elements 18,20, with respect to one another, along a longitudinal axis 21 of the rear axle arrangement 16. In the exemplary embodiment, the first rear axle element 18 includes a rectangular tube portion 22 that is integrally joined to and forms part of the rear end of the frame 12.

In the exemplary embodiments shown in the drawings, both of the rear wheels 14,14 of the applicator 10 are operatively connected to the frame 12 by telescoping rear axle arrangements, of the type addressed by the invention, with the tube portion 22 of the first rear axle element 18 receiving the second rear axle elements 20 for telescopically connecting both the left and right rear wheels 14,14 of the applicator 10 to the frame 12. Although only the telescoping rear axle arrangement 16 for the left rear wheel 14 of the applicator 10 is specifically described herein, it is understood that the description would also apply to practice of the invention at the right rear wheel 14 of the applicator 10.

As shown in FIG. 2 the exemplary embodiment of the rear telescoping axle arrangement 16 also includes a track-width adjusting element, in the form of a hydraulic cylinder 30, that is operatively connected between the first and second rear axle elements 18,20 for selectively extending and retracting the second rear axle element 20 of the rear telescoping axle 16, for adjusting the track-width of the applicator 10. In various forms of the invention, the track-width adjusting element may be manually operable, or include a powered element such as a hydraulic cylinder, an electrically-driven linear actuator, or any other appropriate type of actuator.

As shown in FIG. 2, the frame 12 of the applicator 10 defines a fore-aft axis 32 of the applicator 10 and a transverse axis, coincident with longitudinal axis 21, extending generally transverse to the fore-aft axis 32 and substantially horizontal to the ground surface 13. As noted above, in the exemplary embodiments shown herein, the first rear axle element 18, including tube portion 22, forming part of the rear of the frame 12, is fixedly attached to the frame 12 and extends along the longitudinal axis 21 of the telescoping rear axle arrangement 16. The first rear axle element 18 includes the tubular portion 22 and the second rear axle element 20 is configured for sliding engagement within the tubular portion 22 of the first rear axle element 18.

As shown in FIGS. 2 and 3, in the exemplary embodiments described herein, the second axle element 20 of the rear axle arrangement 16 terminates at an outboard distal end thereof in a mounting pad 38 for attaching an independent suspension element 40 operatively connecting the left rear wheel 14 to the mounting pad 38. All four wheels 14,14,14,14 are similarly attached to the frame.

As further shown in FIGS. 2 and 3, the inner distal end 39 of the second rear axle element 20 of the rear axle arrangement 16 is contoured to extend generally vertically with respect to the longitudinal axis 21 of the rear axle arrangement 16.

As indicated in FIG. 3, the second rear axle elements 20,20 for the left and right rear wheels 14,14 are configured to extend as far as possible into the tubular portion 22 of the first rear axle element 18, so that their respective inner distal ends 39,39 essentially almost meet at the longitudinal centerline 32 of the frame 12, when the rear extensible axle arrangement 16 is contracted to it is narrowest allowed width.

This configuration allows the engaged length 44 of the second axle elements 20,20 to provide a maximized moment arm, essentially equal to the engaged length 44, between an upwardly directed reaction force 46 of the frame 12 at the inner distal ends 39 of the second axle elements 20 and a downwardly directed reaction force 48 of the frame 12 where the second axle elements 20 exit the tubular portion 22 of the first rear axle element 18, to counteract a predominant downwardly directed sprung load 50 resulting from the weight of the applicator 10, the sprayer 11 and its payload, and any other loads carried by the applicator frame 12. Having the inner distal ends 39,39 of the second rear axle elements 20,20 extend a maximum distance into the tubular portion 22 of the first rear axle element 18 of the rear axle arrangement 16 at the maximum allowed retracted position will also desirably result in the engaged length 44 being maximized at all allowable extensions of the rear axle arrangement 16, thereby also providing a maximized moment arm for resisting the sprung load 50 at all allowable extensions of the rear axle arrangement 16.

Figure 4:
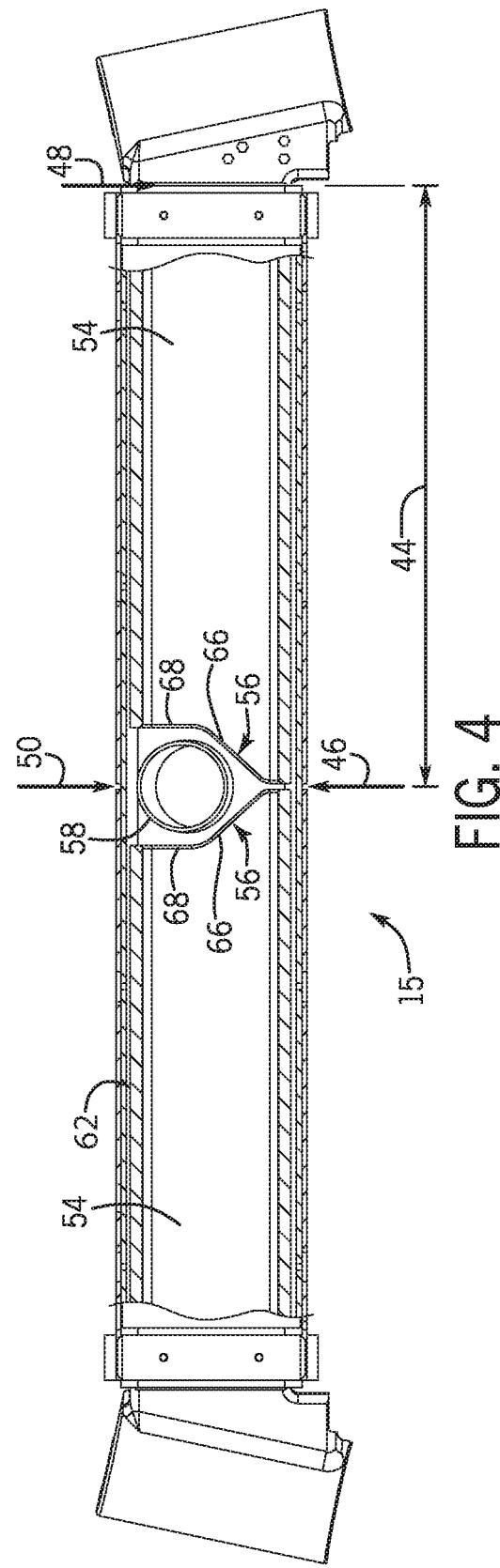
FIG. 4 is an orthographic, partially sectioned illustration of a front telescoping axle of the applicator and frame of FIGS. 1 and 2, showing the exploded components of FIG. 2 in an assembled and fully retracted state.

As shown in FIGS. 2 and 4, the front axle arrangement 15 is generally similar in construction and operation to that of the rear axle arrangement 16 described above, with the notable difference that the inner distal ends 56,56 of the second front axle elements 54,54 are contoured to clear an obstruction in the form of a cylindrically shaped tubular tunnel 58 that extends generally along the fore aft axis 32 of the frame 12 through a first front axle element 52, to allow passage of a drive shaft (not shown) through the front axle arrangement 15.

Specifically, as further shown in FIGS. 2 and 4, the exemplary embodiment of the front telescoping axle arrangement 15 includes first and second slidingly engaging axle elements 52,54 adapted for operative connection between the frame 12 and the each of the front wheels 14,14, to provide extension and retraction of the first and second front axle elements 52,54, with respect to one another, along a longitudinal axis 60 of the front axle arrangement 15 that extends generally parallel to the longitudinal axis 21 of the telescoping rear axle arrangement 16 of the frame 12. In the exemplary embodiment, the first front axle element 52 includes is a rectangular tube 62 that is integrally joined to and forms part of the front end of the frame 12.

In the exemplary embodiments shown in the drawings, both of the front wheels 14,14 of the applicator 10 are operatively connected to the frame 12 by front telescoping axle arrangements 15, of the type addressed by the invention, with the tube 62 of the first axle element 52 receiving the second axle elements 54 for telescopically connecting both the left and right front wheels 14,14 of the applicator 10 to the frame 12. Although only the telescoping axle arrangement 16 for the left front wheel 14 of the applicator 10 is specifically described in detail herein, it is understood that the description would also apply to practice of the invention at the right front wheel 14 of the applicator 10.

As shown in FIG. 2 the exemplary embodiment of the front telescoping axle arrangement 15 also includes a track-width adjusting element, in the form of a hydraulic cylinder 64, that is operatively connected between the first and second front axle elements 52,54 for selectively extending and retracting the second element 54 of the telescoping front axle 15, for adjusting the track-width of the applicator 10. In various forms of the invention, the track-width adjusting element may be manually operable, or include a powered element such as a hydraulic cylinder, an electrically-driven linear actuator, or any other appropriate type of actuator.

As shown in FIG. 4, the inner distal ends 56,56 of the second front axle elements 54,54 are contoured to extend at least partly under the cylindrical tunnel 58 extending through the first front axle element 52, when the second front axle elements 54 are inserted at a maximum allowed depth 44 into the first axle element 52. Specifically, in the exemplary embodiment, the inner distal ends 56 of the second front axle elements 54 are each shaped to include a first upwardly expanding tapered section 66 extending from a terminal end of the second front axle elements 54,54 to a point of intersection with a vertically extending section 68 of inner distal end 56 of each of the second front axle elements 54.

By virtue of the manner in which the contoured inner distal ends 56,56 of the second front axle elements 54,54 are shaped in the exemplary embodiment, the bottom surfaces of each of the second front axle elements 54,54 are longer than the top surfaces of the second front axle elements 54,54, and extend at least partly beneath the tunnel 58 to essentially the same length of engagement 44 as the inner distal ends 39 of the first rear axle elements 20. As depicted in FIG. 4, this results in essentially the same maximization of engaged length 44 in the front axle arrangement 15 as previously described above with regard to the rear axle 16, for reacting the sprung load 50 of the applicator 10. The invention thus accommodates the passage in tube 62 in the first front axle element 52 in a manner that allows for maintaining maximum possible engagement between telescoping elements of the axle at all allowable track widths.

Use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A telescoping axle arrangement for an agricultural applicator having a frame supported above a ground surface by a ground engaging wheel operatively connected to the frame by the telescoping axle arrangement, the telescoping axle arrangement having:
   first and second slidingly engaging axle elements adapted for operative connection between the frame and the wheel, for sliding extension and retraction along a longitudinal axis of the axle;
   the first axle element having a tubular portion and the second axle element being configured for sliding engagement within the tubular portion of the first axle element with the second axle element having an inner end thereof adapted for insertion into the first axle element;

the tubular portion of the first axle element defining a generally tubular cross section perpendicular to the longitudinal axis of the axle, and also having an obstruction extending into the interior of the tubular cross section and limiting insertion of the inner end of the second axle element into the first axle element along the longitudinal axis of the axle;

the obstruction and inner end of the second axle element being contoured such that the inner end of the second axle element extends at least partly past the obstruction in the first axle element when the second axle element is inserted at a maximum allowed depth into the first axle element.

2. The telescoping axle arrangement of claim 1, wherein the frame of the applicator defines a fore-aft axis of the applicator, and a transverse axis extending generally transverse to the fore-aft axis and substantially horizontal to the ground surface, and the first axle element is adapted for fixed attachment to the frame with the longitudinal axis of the telescoping axle arrangement extending generally along the transverse axis of the frame.

3. The telescoping axle arrangement of claim 2, wherein the frame of the applicator is subject to a downward load, the obstruction extends in the fore-aft direction into the tubular portion of the first axle element, and the inner end of the second axle element is contoured such that a bottom surface of the second axle element is longer than a top surface of the second axle element to extend at least partly beneath the obstruction.

4. The telescoping axle arrangement of claim 3, wherein the obstruction is a tubular tunnel extending in the fore-aft direction through the first axle element.

5. The telescoping axle arrangement of claim 4, wherein the tubular tunnel is cylindrical in cross section.

6. The telescoping axle arrangement of claim 5, wherein the contoured inner end of the second axle element includes an upwardly expanding tapered section extending from an inner distal end of the second axle.

7. The telescoping axle arrangement of claim 5, wherein the contoured inner end of the second axle element includes a first upwardly expanding tapered section extending from an inner distal end of the second axle element to a point of intersection with a vertically extending section of the contoured end.

8. A frame for an agricultural applicator having a telescoping axle arrangement for adjusting a track width of the applicator, wherein:

the frame is configured to be supported above a ground surface by a ground engaging wheel operatively connected to the frame by the telescoping axle arrangement; and the telescoping axle arrangement includes first and second slidingly engaging axle elements adapted for operative connection between the frame and the wheel, for sliding extension and retraction along a longitudinal axis of the axle;

the first axle element has a tubular portion and the second axle element is configured for sliding engagement within the tubular portion of the first axle element with the second axle element having an inner end thereof adapted for insertion into the first axle element;

the tubular portion of the first axle element defines a generally tubular cross section perpendicular to the longitudinal axis of the axle, and also defines an obstruction extending into the interior of the tubular cross section and limiting insertion of the inner end of the second axle element into the first axle element along the longitudinal axis of the axle; and the obstruction and inner end of the second axle element are contoured such that the inner end of the second axle element extends at least partly past the obstruction in the first axle element when the second axle element is inserted at a maximum allowed depth into the first axle element.

9. The frame of claim 8, wherein the frame of the applicator defines a fore-aft axis of the applicator, and a transverse axis extending generally transverse to the fore-aft axis and substantially horizontal to the ground surface, and the first axle element is adapted for fixed attachment to the frame with the longitudinal axis of the telescoping axle arrangement extending generally along the transverse axis of the frame.

10. The frame of claim 9, wherein the frame of the applicator is subject to a downward load, the obstruction extends in the fore-aft direction into the tubular shaped portion of the first axle element, and the inner end of the second axle element is contoured such that a bottom surface of the second axle element is longer than a top surface of the second axle element to extend at least partly beneath the obstruction.

11. The frame of claim 10, wherein the obstruction is a tubular tunnel extending in the fore-aft direction through the first axle element.

12. The frame of claim 9, wherein the tubular tunnel is cylindrical in cross section.

13. The frame of claim 12, wherein the contoured inner end of the second axle element includes an upwardly expanding tapered section extending from an inner distal end of the second axle.

14. The frame of claim 8, wherein the contoured inner end of the second axle element includes an upwardly expanding tapered section extending from an inner distal end of the second axle to a point of intersection with a vertically extending section of the contoured end.

15. An agricultural applicator including a frame having a telescoping axle arrangement for adjusting a track width of the applicator, wherein:

the frame is configured to be supported above a ground surface by a ground engaging wheel operatively connected to the frame by the telescoping axle arrangement; and the telescoping axle arrangement includes first and second slidingly engaging axle elements adapted for operative connection between the frame and the wheel, for sliding extension and retraction along a longitudinal axis of the axle;

the first axle element has a tubular portion and the second axle element is configured for sliding engagement within the tubular portion of the first axle element with the second axle element having an inner end thereof adapted for insertion into the first axle element;

the tubular portion of the first axle element defines a generally tubular cross section perpendicular to the longitudinal axis of the axle, and also defines an obstruction extending into the interior of the tubular cross section and limiting insertion of the inner end of the second axle element into the first axle element along the longitudinal axis of the axle; and the obstruction and inner end of the second axle element are contoured such that the inner end of the second axle element extends at least partly past the obstruction in the first axle element when the second axle element is inserted at a maximum allowed depth into the first axle element.

16. The agricultural applicator of claim 15, wherein the frame of the applicator defines a fore-aft axis of the applicator, and a transverse axis extending generally transverse to the fore-aft axis and substantially horizontal to the ground surface, and the first axle element is adapted for fixed attachment to the frame with the longitudinal axis of the telescoping axle arrangement extending generally along the transverse axis of the frame.

17. The agricultural applicator of claim 16, wherein the frame of the applicator is subject to a downward load, the obstruction extends in the fore-aft direction into the tubular portion of the first axle element, and the inner end of the second axle element is contoured such that a bottom surface of the second axle element is longer than a top surface of the second axle element to extend at least partly beneath the obstruction.

18. The agricultural applicator of claim 17, wherein the obstruction is a tubular tunnel extending in the fore-aft direction through the first axle element.

19. The agricultural applicator of claim 18, wherein the contoured inner end of the second axle element includes an upwardly expanding tapered section extending from an inner distal end of the second axle.

20. The frame of claim 19, wherein the contoured inner end of the second axle element includes an upwardly expanding tapered section extending from an inner distal end of the second axle to a point of intersection with a vertically extending section of the contoured end.

\* \* \* \* \*